Feb. 24, 1970  J. W. ROSS  3,497,424
CATION SENSITIVE ELECTRODE AND PROCESS
Filed March 19, 1968

INVENTOR
JAMES W. ROSS
BY Robert J. Schiller
ATTORNEY

United States Patent Office 3,497,424
Patented Feb. 24, 1970

3,497,424
CATION SENSITIVE ELECTRODE AND PROCESS
James W. Ross, Newton, Mass., assignor to Orion Research, Incorporated, Cambridge, Mass., a corporation of Massachusetts
Filed Mar. 19, 1968, Ser. No. 714,309
Int. Cl. B01k 3/00; G01n 27/00, 27/30
U.S. Cl. 204—1
8 Claims

ABSTRACT OF THE DISCLOSURE

An electrode particularly sensitive to $Cu^{++}$ ions in solution and having, as the ion-sensitive portion, a body of an ion-exchanger liquid formed of a water-insoluble salt of S-alkyl thiogylcolic acid dissolved in a water-immiscible solvent e.g. a 50:50 mixture of decanol and o-dichlorobenzene.

---

This invention relates to electrochemical detection and measurement, and more particularly to the determination of cations in solution and apparatus therefor.

The activity or concentration of ions in solution have long been determined by a known technique involving an ion-sensitive electrode and a reference electrode both in contact with the solution under test. These electrodes each constitute electrochemical half-cells. Because the half-cell potential of the reference electrode is substantially constant at a fixed temperature and the half-cell potential of the ion-sensitive electrode varies with the activity of the ions in the test solution according to the Nernst equation, the total cell potential is then a function of the ion activity and can be readily ascertained as with a potentiometric measuring device.

A known ion-sensitive electrode of the foregoing type has a structure wherein an ion-sensitive surface is defined by a body of ion-exchange liquid, for example, a salt of a phosphoric acid ester dissolved in decanol, which is substantially immiscible with water. Such electrodes, described in Belgian Patent No. 688,409, are particularly useful for detecting divalent cations such as $Ca^{++}$ and $Mg^{++}$ to which they are particularly sensitive To detect certain other ions such as cupric ion, the usual techniques are still chemical tests such as colorimetric titrations and the like. Such techniques do not lend themselves readily to process monitoring in real time and are necessarily destructive at least to small samples.

A principal object of the present invention is to provide means for electrochemically detecting the presence in solution of cupric ion with quite high selectivity over most other common divalent ions.

Further objects of the present invention are to provide means for providing an output signal voltage related to the activity in solution of cupric ions to provide a sensing electrode sensitive to the foregoing ions in a stable, reproducible manner and relatively insensitive to most other common cations; and to provide an electrode of the type described which readily detects and measures ion activity in substantially real time without materially affecting the composition of the solution under test.

To effect the foregoing objects, generally there is provided an electrode comprising a container supporting both a body of ion exchanger liquid and a body of electrolyte substantially immiscible with one another. The two bodies are in contact with one another either at a common interface or through the pores of a porous spacer. Means are provided for electrically contacting the electrolyte at a fixed contact potential. In a preferred embodiment there is also provided a porous barrier, one side of which is in contact with the ion exchanger liquid, the other side of which is adapted to contact a solution under test. The ion exchanger liquid preferably comprises the salt of an S-alkyl thioglycolic acid usually in a water immiscible solvent.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the present invention, reference should be had to the following detailed description taken in connection with the accompanying drawing wherein:

Figure 1:
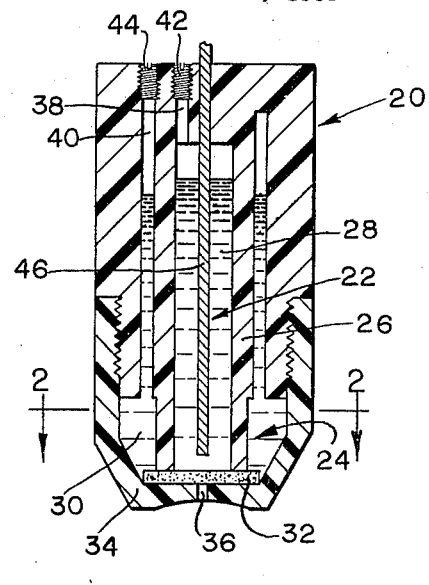
FIG. 1 is an elevational cross-sectional view through the operative portion of an electrode of the present invention.
Figure 2:
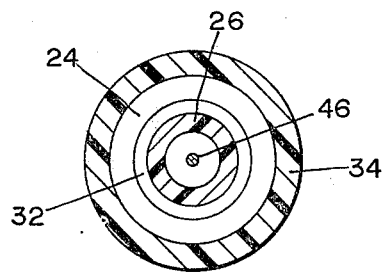
FIG. 2 is a cross-section taken along the line 2—2 of FIG. 1.

Referring now to FIG. 1 there is shown an embodiment of an electrode of the present invention comprising a container such as tubular body 20. Body 20 preferably encloses two volumes or reservoirs 22 and 24, the former being centrally located and the latter being a coaxial chamber about reservoir 22 and separated therefrom by impermeable cylindrical wall 26. Body 20 and wall 26 are formed of electrically insulating material substantially chemically inert to both the electrolyte and the ion exchanger liquid. Typically, body 20 is made of a synthetic polymer such a polytetrafluorethylene, polypropylene, ordinary high resistivity glass, or the like. In assembled form, reservoir 22 contains a body of electrolyte 28 and reservoir 24 contains a body of ion-exchanger liquid 30.

The term "ion exchanger liquid" as used herein is intended to refer to a liquid having ion exchanger therein, either being a liquid ion-exchanger per se or a normally solid ion-exchange material dissolved in a suitable organic solvent. Ion exchange, of course, then can occur at an interface between two immiscible phases (the ion-exchanger liquid and the solution under test) by a metathetical reaction.

The ion-exchanger liquid in the present invention is a particular organic ion-exchange material dissolved in an organic solvent to provide a liquid that is substantially immiscible with water.

The preferred ion-exchange material is an S-alkyl thioglycolic acid, the general formula of which is

R—S—CH$_2$COOH wherein R is an alkyl group, substituted or unsubstituted, preferably from $C_7$ to $C_{13}$, i.e. large enough to render the metal salt of the chelating agent quite insoluble in water yet reasonably soluble in an organic solvent. The alkyl group therefore confers the physical property of relative solubility upon the exchanger and should not be reactive with the solutions being subjected to test for cupric ion. Tests indicate that alkyl groups smaller than $C_7$ tend to have high enough solubility in water to be undesirable while groups larger than $C_{13}$ are with difficulty soluble in organic solvents. The preferred material employs alkyl groups in the $C_9$–$C_{11}$ range.

It is believed that with cupric ion the exchanger chelates the later to form copper bis S-alkyl thio-glycolate, i.e.

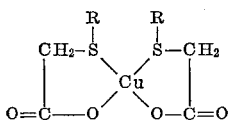

having the typical five-bond rings of a fairly stable chelate which does dissociate to a sufficient extent in an organic solvent to allow the cation to exchange with cations in aqueous solution. This structure is much more stable with $Cu^{++}$ than for example with $Na^+$ and therefore the electrode is more specific in its response to $Cu^{++}$.

To measure cupric activity, for example, it is preferred to provide exchanger liquid which includes the copper salt of the S-alkyl thioglycolic acid. It will be appreciated that when the electrode is placed in contact with a copper solution, drifting potentials result until the exchanger reaches equilibrium with the copper ion concentration in the test or sample solution. Obviously, if the exchanger is already the cupric salt, equilibrium is reached much more quickly and without substantial change in the concentration of the test solution. Thus, the acid per se or some salt thereof other than copper can be used as the exchanger with, however, the understanding that an initial measurement of copper concentration with such an exchanger will present problems until the exchanger has been converted to the copper salt by ion exchange. The term S-alkyl thioglycolate as used in the claims thus is intended to include the acid per se (i.e. the hydrogen "salt") as well as other salts thereof.

A suitable ion-exchange material for use in the present invention is commercially available from Evans Chemetrics, Inc., Waterloo, N.Y. and sold under the name of alkyl ($C_9$ to $C_{11}$) thioacetic acid and includes an indeterminate number of isomers within the indicated range of carbon chains. However, as appears from the structural formula and as indicated by test, this material is correctly characterized as S-alkyl ($C_9$ to $C_{11}$) thioglycolic acid. The cupric salt can be formed from the acid simply by adding at room temperature 0.1 M copper acetate in aqueous phase to the acid in organic phase and agitating the mixture for sufficient time (a few minutes) to convert the acid to the salt. If desired, salts of other cations may be formed in a similar manner.

While a number of organic solvents (each of which acts merely as an inert carrier) are useful, a preferred solvent is a 50:50 mixture of n-decanol and o-dichlorobenzene. The solubility of the exchanger is poor in either decanol or o-dichlorobenzene. The exchanger is considerably more soluble in the mixed solvent system than in either solvent alone.

Both reservoirs 22 and 24 are open at least at one end of each, these open ends terminating in a substantially common plane. Across and in sealing relation to the inner reservoir 22 is membrane 32, a sheet of electrically insulating material, substantially chemically inert to electrolyte 28, exchanger liquid 30 and the test solution it is intended to contact. The membrane further contains a multiplicity of voids or pores, a number of which are interconnected within the membrane and open to the membrane surfaces and edges, thereby providing a plurality of liquid conduits of minute dimensions. The membrane material also is of the type which is preferentially wettable by the ion-exchanger liquid phase. Because in the form shown, membrane 32 is dimensioned so that its peripheral portions are in contact with ion-exchanger liquid 30, its pores tend to be filled by capillarity with liquid 30. Thus a liquid-liquid contact is formed between liquid 30 and electrolyte 28 at or near the inner surface of membrane 32 contacting reservoir 22. Materials from which suitable membranes can be formed are cellulose acetate, polyethylene, polyvinyl acetate and the like. The membrane is preferably quite thin, being in the range of about 3 to 10 mil inches in thickness.

As means for retaining membrane 32 in proper relation to reservoirs 22 and 24 and for forming part of the wall of reservoir 24, there is provided cap 34, threadingly engaged across the open ends of the reservoirs and to body 20. Cap 34 has a small central aperture 36 providing communication from the exterior of the electrode to a surface portion of membrane 30 opposite to the surface of the latter in contact with electrolyte 28. The cap is formed of the same material as body 20.

Passageways 38 and 40 are provided respectively between reservoir 22 and the exterior of the electrode, and reservoir 24 and the electrode exterior so that the reservoirs can be filled with appropriate fluids without removing cap 34. Plugs 42 and 44 are included respectively to releasably seal passageways 38 and 40.

Lastly, extending through body 20 from the exterior thereof to a position within reservoir 22 so as to contact electrolyte 28 is reference electrode 46, i.e. means providing an electronically conductive path from the electrolyte and exhibiting a stable contact potential with the electrolyte. Such a reference electrode is well known in the art and for example is a standard Ag-Ag Cl electrode where electrolyte is for example a 0.1 M aqueous solution of $CuCl_2$. The electrolyte can be any of a number of known internal reference solutions but for measurement of copper activity, the cupric ion in electrolyte 28 provides a stable contact potential between the internal filling solution and the inside surface of the exchanger, and the chloride ion provides a stable potential between reference electrode 46 and electrolyte 28.

The electrode is used simply by immersing cap 34 into the solution under test until the latter contacts membrane 32 through aperture 36. Due to ion exchange at the interfacial surface between the ion-exchange liquid in the membrane and the test solution, a Nernstian potential arises. This latter potential is then measured. As well known, if the test solution is also in contact with the usual reference half-cell such as a calomel electrode, the potential between the two half-cells, which is dependent on the Nernstian potential, can be readily determined by the usual potentiometric device.

The exchanger, preferably but not necessarily, is the salt of the same cation as the cation of interest in the test solution or sample. This avoids problems of initial drift that might occur until the anions of the exchanger are exchanged completely with the different anions of the test solution.

Generally, the electrode of the present invention exhibits Nernst potential behaviour in response to samples with $Cu^{++}$ concentrations between $10^{-1}$ and $10^{-5}$ M in accordance with the following:

(1) $$E = K + 2.3\ (RT/2F)\ \log A$$

where:

E is the total measured potential of the system;
K is a constant dependent on the choice of reference electrodes and electrolyte;
2.3 $RT/2F$ is the Nernst factor (59.16 mv. at 25° C.); and
A is the activity in the test sample of the cation of interest.

Figure 3:
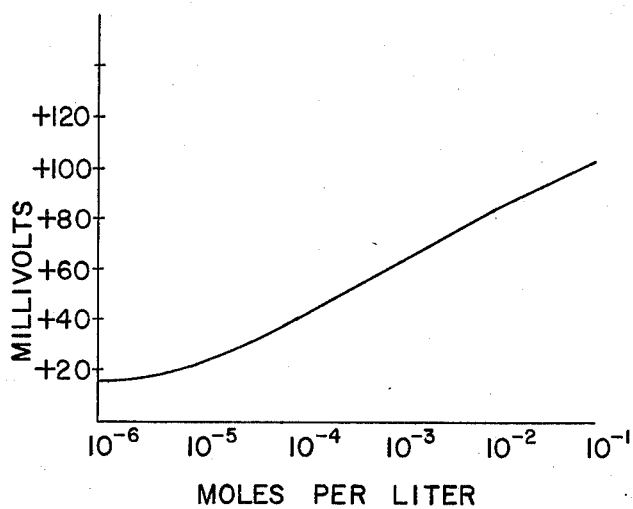
FIG. 3 is a graph showing the response of an electrode of the invention to various concentrations of cupric ion.

A typical response curve for an electrode of the present invention is shown in FIG. 3 wherein the response in millivolts has been plotted against moles/liter ($CuSO_4$) in the test or sample solution.

In mixed cation solutions, the electrode response is given by (2) $$E = K + 2.3 \frac{RT}{2F} \log (A + iC^{2/n})$$

where C is the concentration of the interfering cation, $n$ is the valence state of the latter, and $i$ is the selectivity constant of the interfering cation.

Selectivity constants for use with electrodes of the present invention, based upon an arbitrary value of $i=2$ for $Cu^{++}$, are as follows:

| Ion: | $i$ |
|---|---|
| $H^+$ | $7 \times 10^3$ |
| $Fe^{++}$ | 1.0 |
| $Ni^{++}$ | $5 \times 10^{-3}$ |
| $Zn^{++}$ | $1 \times 10^{-3}$ |
| $Na^+$ | $<10^{-3}$ |
| $K^+$ | $<10^{-3}$ |
| $Ca^+$ | $5 \times 10^{-4}$ |
| $Sr^{++}$ | $2 \times 10^{-4}$ |
| $Ba^{++}$ | $2 \times 10^{-4}$ |
| $Mg^{++}$ | $<10^{-4}$ |

From the foregoing it will be seen that at equilibrium, the selectivity of the electrode is 7000/1 for $H^+$ over $Cu^{++}$, 500/1 for $Cu^{++}$ over $Ni^{++}$, etc. The electrode appears equally selective for both cupric and ferrous ion. However, ferrous ion in aqueous solution tends to oxidize to the ferric state, and thus the solution is not stable with respect to ferrous ion. If the test solution were a stable system, the electrode would measure ferrous ion. Also, anions forming copper salts soluble in the exchanger tend to cause interfering effects. For example, chloride, bromide and perchlorate should preferably not be present in in amounts greater than $10^{-2}$ M. Because of the high response of the electrode to $H^+$, the useful pH range of the electrode is about 2.5 pH units and depends on the cupric ion concentration in the sample solution, i.e. concentrated solutions can be measured at a lower pH than dilute solutions. The lower pH limit is determined by hydrogen ion interference; the upper limit is reached when cupric ion begins to precipitate out as copper hydroxide. Hydrogen ion interference can be considerably reduced simply by adjusting the pH of a test solution to 6 with NaOH (if acid) or $H_2SO_4$ (if basic).

These electrodes of the present invention reach an equilibrium potential reflecting ion activity quite rapidly. For example, an electrode formed with copper bis S-alkyl thioglycolate in decanol and o-dichlorobenzene (typically 47 grams of alkyl acid per liter of solvent) will substantially reach its equilibrium potential with respect to a test solution of copper sulfate in water within about 30 seconds or less.

What is claimed is:

1. An electrode sensitive to the activity of ions in an equeous solution comprising:
   a liquid organic phase containing an S-alkyl thioglycolate, said organic phase being substantially immiscible in aqueous solution;
   a means for so containing the organic phase as to provide an interface for ion exchange between said organic phase and the aqueous solution; and
   means for forming an electrical contact with said organic phase at a fixed contact potential.

2. An electrode as defined in claim 1 wherein said S-alkyl thioglycolate has the general formula $$R—S—CH_2COO—$$

wherein R is an alkyl, substituted or unsubstituted having a carbon chain with from 7 to 13 carbon atoms.

3. An electrode as defined in claim 1 wherein the alkyl group in said thioglycolate is selected from the alkyls within the group from $C_9$ to $C_{11}$.

4. An electrode as defined in claim 3 wherein said ion-exchanger liquid comprises a substantially water immiscible organic solvent in which said thioglycolate is dissolved.

5. An electrode as defined in claim 4 wherein said solvent includes n-decanol and o-dichlorobenzene in substantially equal proportions.

6. An electrode as defined in claim 1 wherein said liquid comprises cupric bis S-alkyl thioglycolate dissolved in an organic solvent selected such that said liquid is substantially insoluble in water.

7. A process of determining the activity of ions in an aqueous solution comprising the steps of
   establishing a stable electrical contact potential with a portion of a unitary body of substantially water-insoluble liquid containing an S-alkyl thioglycolate having from 7 to 13 carbon atoms in its alkyl group,
   contacting another portion of said body with said solution, and
   detecting the potential arising across the interface between said body and said solution.

8. A process as defined in claim 7, including the further step of measuring the said potential established across said interface.

References Cited

UNITED STATES PATENTS

| | | | |
|---|---|---|---|
| 3,406,102 | 10/1968 | Frant et al. | 204—1 |
| 3,429,785 | 2/1969 | Ross | 204—195 XR |
| 3,438,886 | 4/1969 | Ross | 204—195 |
| 3,442,782 | 5/1969 | Shiller et al. | 204—195 |
| 3,445,365 | 5/1969 | Ross | 204—195 |
| 3,448,032 | 6/1969 | Settzo et al. | 204—195 |

JOHN H. MACK, Primary Examiner

G. L. KAPLAN, Assistant Examiner

U.S. Cl. X.R.

204—195